United States Patent [19]

Navon

[11] Patent Number: 4,717,220
[45] Date of Patent: Jan. 5, 1988

[54] LIQUID OPTICAL FILTER AND METHOD FOR THE NEAR INFRARED LIGHT

[75] Inventor: Gil Navon, Ramat Gan, Israel

[73] Assignee: Ramot University Authority for Applied Research & Industrial Development Ltd., Tel Aviv, Israel

[21] Appl. No.: 817,083

[22] Filed: Jan. 8, 1986

[30] Foreign Application Priority Data

Jan. 25, 1985 [IL] Israel .................................. 74159

[51] Int. Cl.⁴ ................................................. G02B 5/24
[52] U.S. Cl. ...................................... 350/1.5; 350/312; 350/320
[58] Field of Search ........................ 350/1.5, 312, 320

[56] References Cited

U.S. PATENT DOCUMENTS 4,108,373 8/1978 Chiapale et al. ..................... 126/428

Primary Examiner—Bruce Y. Arnold
Assistant Examiner—Terry S. Callaghan
Attorney, Agent, or Firm—Benjamin J. Barish

[57] ABSTRACT

A method and filter particularly useful in greenhouses for optically filtering solar radiation by circulating an aqueous solution of copper salts with added chloride salts so that the chloride concentration is greater than 0.7 N to form a complex which has optical absorption properties stronger than free copper ions.

20 Claims, 1 Drawing Figure

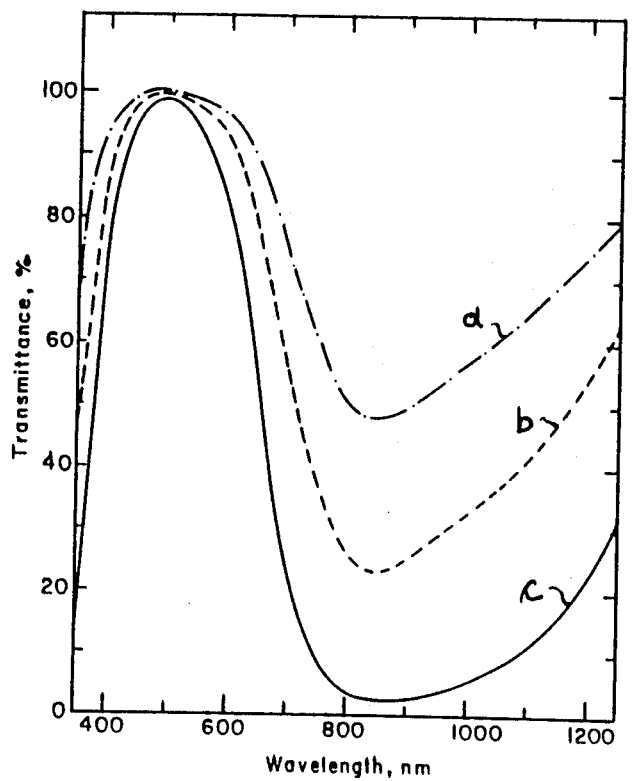

LIQUID OPTICAL FILTER AND METHOD FOR THE NEAR INFRARED LIGHT

BACKGROUND OF THE INVENTION

The present invention relates to a liquid solution optical filter which is transparent to the visible, and absorbs the near infrared radiation. The invention is particularly useful for optically filtering the solar radiation received by greenhouses, in order to shield the interior of the greenhouse from the infrared heat energy in such radiation, and to store the absorbed heat. The invention is therefore described below with respect to this application.

About half of the solar energy that reaches the surface of the earth is in the visible region and is utilized by plants for photosynthesis. The remaining half of the solar energy is in the near infrared region and has no function except heating. There are many applications of optical filter solutions which absorb the heat irradiation in the near infrared region while transmitting therethrough the radiation in the visible region. An important application in greenhouses, where the optical filter solution not only reduces the heat penetrating into the interior of the greenhouse during the daytime, but also stores the heat and uses same for heating the greenhouse interior during the nightime.

U.S. Pat. No. 4,108,373, discloses one such application for greenhouses. The optical filter described in that patent is an aqueous solution of copper chloride in water in a proportion of 25 grams/liter. However, it has been found that the solution suggested in this patent does not have good spectral properties, since it exhibits strong absorption in the visible region.

SUMMARY OF THE INVENTION

An object of the present invention is to provide a method of optically filtering, and also an optical filter solution, having advantages in the above respects.

According to a broad aspect of the present invention, there is provided a method of optically filtering solar radiation by circulating an aqueous solution of copper salts, characterized in that the aqueous solution has a chloride ion concentration greater than 0.7 N to form a complex with the copper ions which has optical absorption properties stronger than free copper ions.

It will be appreciated that the chloride ion concentration in the above method is much higher than that used in the above-cited U.S. Pat. No. 4,108,373. Thus, the amount of copper chloride used in the process described in the latter patent is 25 grams/liter, which produces a chloride ion concentration of about 0.3 N. In such a solution, most of the absorption is effected by the free copper ions.

BRIEF DESCRIPTION OF THE DRAWINGS

The attached single drawing illustrates the percentage transmittance of a preferred solution in accordance with the present invention.

DESCRIPTION OF PREFERRED EMBODIMENTS

The present invention is based on the discovery that if the chloride ion concentration is substantially increased by adding a chloride salt, such as NaCl, KCl, or $MgCl_2$, to be greater than 0.7 N, the copper ions form a complex which has optical absorption properties substantially stronger than those of the free copper ions, and a spectrum which is shifted to the infrared region. The shift in the spectrum improves the transparency of the solution in the visible region, and the optical absorption in the infrared region. The increase of the absorption coefficient permits the use of small concentration of copper, thus decreasing the toxicity of the solution, and also lowering their cost. The preferred ion concentration range is from 1.5 N to the solubility limit of the chloride salt. In addition, it has been found that such optical filter solutions are much more stable over longer periods of time as compared to the filter solutions which are based on iron ions.

Examples are set forth below in which various types of soluble chlorides have been added to solutions containing copper salts such as copper sulfate, copper chloride, or copper nitrate. The soluble chloride added could be sodium chloride, which is the least expensive and is very soluble; potassium chloride, which is more expensive and slightly less soluble but less harmful to the plants since this is also used as a fertilizer; or magnesium chloride, which is more expensive but more soluble so as to reduce the possibility of crystalization from the solution. Any combination of the salts, such as a 1:1 mixture of NaCl and KCl, may have some advantage in obtaining higher chloride concentrations with reduced danger of crystallization. It is even contemplated that carnalite ($KCl.MgCl_2.6H_2O$), which is an inexpensive intermediate in the production of KCl sea water or from the Dead Sea, may also be used to provide an optical filter solution of minimum cost at least in that area.

The pH of the solution should be lower than 5.5 to avoid precipitation of copper hydroxide. An optimum pH for many applications is about 4.0. A buffer, such as an acetate buffer, could be included so as to stabilize the pH. It has been found that the optical filter solutions in accordance with the present invention even without the buffer experience a very small pH change even after standing for months in direct sunlight. They are also stable and do not change their optical absorption properties even after such extended periods.

Following are a number of examples of optical filter solutions made in accordance with the present invention. In all the following examples, the final concentration of copper ions was 0.05 M and the chloride concentration was 2.0 N. According to the specific application, one may use higher chloride concentrations, as large as 3, 4 or 5 N, in which case, the copper ion concentration may be reduced for the same filtering effectiveness. In fact, these higher chloride concentrations improve the spectral properties.

EXAMPLE 1

12.5 gr. $CuSO_4.5H_2O$ and 150 gr. KCl dissolved in 1 liter of water.

EXAMPLE 2

12.5 gr. $CuSO_4.5H_2O$ and 117 gr. NaCl dissolved in 1 liter of water.

EXAMPLE 3

12.5 gr. $CuSO_4.5H_2O$, 76 gr. KCL and 59 gr. NaCl in 1 liter of water.

EXAMPLE 4

12.5 gr. $CuSO_4.5H_2O$ and 95 gr. $MgCl_2$ or 203 gr. $MgCl_2.6H_2O$ dissolved in 1 liter of water.

EXAMPLE 5

12.5 gr. $CuSO_4.5H_2O$ and 185 gr. carnalite ($KCl.MgCl_2.6H_2O$) dissolved in 1 liter of water.

EXAMPLE 6

12.5 gr. $CuSO_4.5H_2O$ dissolved in 0.5 liter of sea water taken from the Dead Sea and 0.5 liter of water.

EXAMPLE 7

Same as examples 1–5 but with 8.5 gr. $CuCl_2.2H_2O$ instead of the $CuSO_4.5H_2O$.

EXAMPLE 8

Same as examples 1–5 but with 12.1 gr. $Cu(NO_3)_2.3H_2O$ instead of the $CuSO_4.5H_2O$.

EXAMPLE 9

Same as examples 1–5, 7, 8, but the concentration of the chloride salts is increased by a factor of 1.5, reducing the copper salt concentration by 15%.

EXAMPLE 10

Same as Examples 1–5, 7, 8, but with the concentration of the chloride salts doubled, reducing the copper salts concentration by 30%.

Example 11

Sea water from the Dead Sea containing 9 gr. of $CuSO_4.5H_2O$ or, alternatively, 6 gr. of $CuCl_2.2H_2O$.

EXAMPLE 12

Same as examples 1–7 but with the addition of 4.7 acetic acid and 2.45 gr. sodium acetate trihydrate ($C_2H_3O_2Na.3H_2O$) to give solutions containing acetate buffer 0.1 M with an approximate pH of 4.0.

EXAMPLE 13

Same as Examples 1–11, but the addition of 8 ml., or 0.8 ml. concentrated HCl solution (36%) to give solutions with approximate pH values of 1 and 2, respectively.

EXAMPLE 14

Same as examples 1–13 but using sea water instead of water.

The accompanying drawing illustrates the percent transmittance of solutions containing various concentrations of $Cu^{++}$ in 2M KCl and with an optical path length of 6 mm., curve a being for a $Cu^{++}$ concentration of 0.02 M, curve b being for a $Cu^{++}$ concentration of 0.04 M, and curve c being for a $Cu^{++}$ concentration of 0.1 M.

While the invention has been described with respect to a number of preferred embodiments, it will be appreciated that many other variations, modifications and applications of the invention may be made.

What is claimed is:

1. An optical filter solution characterized in that it includes copper and chloride having a chloride ion concentration greater than 0.7 N to form a complex which has optical absorption properties stronger than free copper ions.
2. The filter according to claim 1, wherein said solution has a chloride ion concentration in the range of 1.0 N to the solubility limit of the chloride salt.
3. The filter according to claim 1, wherein the pH of the solution is lower than 6.0
4. The filter according to claim 1, wherein said aqueous solution is made by dissolving copper sulfate and a soluble chloride salt in water.
5. The filter according to claim 1, wherein said aqueous solution further includes a buffer to provide a pH of approximately 4.0.
6. A greenhouse having an optical filter solution circulating therethrough for absorbing solar radiation, said optical filter solution including copper and chloride having a chloride ion concentration greater than 0.7 N to form a complex which has optical absorption properties stronger than free copper ions.
7. A method for optically filtering solar radiation by an aqueous solution of copper ions, characterized in that the aqueous solution has a chloride ion concentration greater than 0.7 N to form a complex which has optical absorption properties stronger than free copper ions.
8. The method according to claim 7, wherein said solution has a chloride ion concentration in the range of 1.0 N to the solubility limit of the chloride salt.
9. The method according to claim 7, wherein the pH of the solution is lower than 6.0.
10. The method according to claim 9, wherein the pH of the solution is about 4.0.
11. The method according to claim 7, wherein said aqueous solution is made by dissolving a copper sulfate and a soluble chloride salt in water.
12. The method according to claim 11, wherein said soluble chloride salt is sodium chloride.
13. The method according to claim 11, wherein said soluble chloride salt is potassium chloride.
14. The method according to claim 11, wherein said soluble chloride salt is magnesium chloride.
15. The method according to claim 11, wherein said soluble chloride salt is a mixture of two or more chloride containing salts.
16. The method according to claim 5, wherein said soluble chloride salt is carnalite.
17. The method according to claim 5, wherein said aqueous solution is sea water.
18. The method according to claim 7, wherein said aqueous solution is made by dissolving a copper chloride and a soluble chloride salt in water.
19. The method according to claim 7, wherein said aqueous solution is made by dissolving a copper nitrate and a soluble chloride salt in water.
20. The method according to claim 7, wherein said aqueous solution further includes a buffer to provide a pH of approximately 4.0.

* * * * *